United States Patent
Vuskovic et al.

(10) Patent No.: US 9,432,417 B2
(45) Date of Patent: Aug. 30, 2016

(54) EMBEDDABLE MEDIA UPLOAD OBJECT

(71) Applicant: Google Inc., Mountain View, CA (US)

(72) Inventors: Vladimir Vuskovic, Zurich (SZ); Jaroslaw Jerzy Wilkiewicz, Menlo Park, CA (US); Eric P. Lundberg, Zurich (SZ); Jeffrey Alan Posnick, New York, NY (US)

(73) Assignee: Google Inc., Mountain View, CA (US)

( * ) Notice: Subject to any disclaimer, the term of this patent is extended or adjusted under 35 U.S.C. 154(b) by 179 days.

(21) Appl. No.: 13/926,998

(22) Filed: Jun. 25, 2013

(65) Prior Publication Data

US 2015/0135076 A1     May 14, 2015

Related U.S. Application Data

(60) Provisional application No. 61/664,138, filed on Jun. 25, 2012.

(51) Int. Cl.
| | |
|---|---|
| *H04L 29/06* | (2006.01) |
| *H04N 21/2743* | (2011.01) |
| *H04N 21/4223* | (2011.01) |
| *H04N 21/4782* | (2011.01) |

(52) U.S. Cl.
CPC .......... *H04L 65/40* (2013.01); *H04N 21/2743* (2013.01); *H04N 21/4223* (2013.01); *H04N 21/4782* (2013.01)

(58) Field of Classification Search
None
See application file for complete search history.

(56) References Cited

U.S. PATENT DOCUMENTS

| | | | |
|---|---|---|---|
| 8,311,382 B1* | 11/2012 | Harwell et al. | 386/200 |
| 2006/0053224 A1 | 3/2006 | Subramaniam | |
| 2007/0203911 A1 | 8/2007 | Chiu | |
| 2008/0028037 A1 | 1/2008 | Moyer et al. | |
| 2008/0256563 A1 | 10/2008 | Han | |
| 2009/0064005 A1 | 3/2009 | Cunningham et al. | |
| 2013/0083210 A1* | 4/2013 | Beckham et al. | 348/207.11 |

FOREIGN PATENT DOCUMENTS

KR     10-2012-0015002 A     2/2012

OTHER PUBLICATIONS

PCT International Search Report and Written Opinion for PCT/US2013/047721, Sep. 27, 2013, 9 Pages.

(Continued)

*Primary Examiner* — Jeffrey A Gaffin
*Assistant Examiner* — Nhat-Huy T Nguyen
(74) *Attorney, Agent, or Firm* — Fenwick & West LLP

(57) ABSTRACT

A user device's browser receives a page from a publishing system and presents content of the page within a window. Instructions from a media hosting system cause a frame to be created within the window. The frame includes a media upload object from a media hosting system that has a different address domain that the publishing system. A communication channel is established between the window and the frame to allow messages to be exchanged. The media upload object allows a user to create a media item and upload it to the media hosting system. Throughout the process of creating and uploading the media item, the media upload object transmits one or more messages to the page via the communication channel. Based on the messages, the page responds to what is occurring within the frame.

18 Claims, 15 Drawing Sheets

(56) References Cited

OTHER PUBLICATIONS

Anonymous, "HTML5 Web Messaging", W3C Working Draft Mar. 13, 2012, Retrieved from the Internet: URL:https://www.w3.org/TR/2012/WD-webmessaging-20120313/ [retrieved on Jan. 13, 2016], 20 Pages.

Walsh, D., "HTML5's window.postMessage API," Design Conference San Francisco, Nov. 3, 2010, Retrieved from the Internet: URL:https://davidwalsh.name/window-postmessage [retrieved on Jan. 14, 2016], 14 Pages.

Extended European Search Report for European Patent Application No. EP 13809281.2, Jan. 21, 2016, 12 Pages.

* cited by examiner

EMBEDDABLE MEDIA UPLOAD OBJECT

CROSS-REFERENCE TO RELATED APPLICATIONS

This application claims the benefit of provisional application 61/664,138, filed on Jun. 25, 2012, which is incorporated by reference in its entirety.

BACKGROUND

1. Technical Field

The described embodiments pertain in general to media content, and in particular to an embeddable media upload object through which media items can be uploaded to a media hosting system.

2. Description of the Related Art

Through the use of the Internet, users are easily able to share content with other users. For example, users may share content through a blog, a social network, a board, or a forum. As part of sharing content a user may wish to share some type of media, such as a video, with other users. However, the entity through which the user typically shares content may not have the capabilities to host certain types of media. For example, a forum website for gardening may not have the server resources to handle video uploads by users.

SUMMARY

The described embodiments provide methods, computer program products, and systems for embedding a media upload object. A user device's browser receives a page from a publishing system and presents content of the page within a window. Instructions from a media hosting system cause a frame to be created within the window. The frame includes a media upload object from a media hosting system 102 that has a different address domain that the publishing system. A communication channel is established between the window and the frame to allow messages to be exchanged even though they include content from different domains.

The media upload object allows a user to create a media item and upload it to the media hosting system. Throughout the process of creating and uploading the media item, the media upload object transmits one or more messages to the page via the communication channel. The messages notify the page of events occurring within the frame. Based on the messages, the page responds to what is occurring within the frame.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
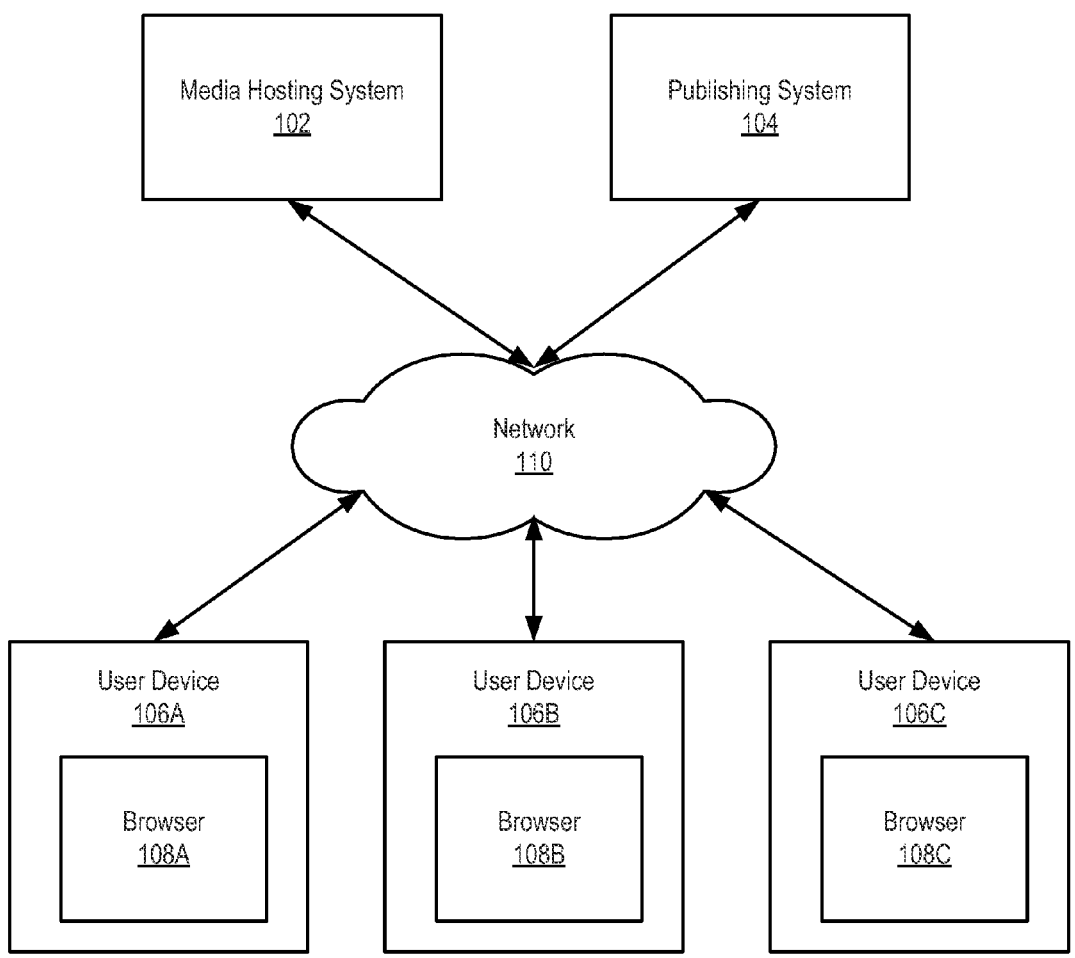
FIG. 1 is a block diagram of a media hosting environment 100 according to one embodiment.

FIG. 1 is a block diagram of a media hosting environment 100 according to one embodiment. FIG. 1 illustrates a media hosting system 102, a publishing system 104, and three user devices 106 connected via a network 110. Each user device 106 includes a browser 108. Although the illustrated environment 100 includes only a select number of each entity, other embodiments can include more or less of each entity (e.g., additional publishing systems 104 and user devices 106).

FIG. 1 uses like reference numerals to identify like elements. A letter after a reference numeral, such as "106A," indicates that the text refers specifically to the element having that particular reference numeral. A reference numeral in the text without a following letter, such as "106," refers to any or all of the elements in the figures bearing that reference numeral (e.g. "106" in the text refers to reference numerals "106A," "106B," and/or "106C" in the figures).

The network 110 represents the communication pathway between media hosting system 102, the publishing system 104, and the user devices 106. In one embodiment, the network 110 is the Internet and uses standard communications technologies and/or protocols. The network 110 can also utilize dedicated, custom, or private communications links that are not necessarily part of the Internet. The network 110 may comprise any combination of local area and/or wide area networks, using both wired and wireless communication systems.

The media hosting system 102 is a system that provides users with access to media items. A media item (also referred to as "media content") is content that includes one or more types of media, such as text, video, audio, or animation. Upon receiving a request for a media item from a user device 106, the media hosting system 102 transmits (e.g., streams) the media item to the device 106. In one embodiment, the item is played on the user device 106 by a media player (e.g., a video player).

In one embodiment, the media items that the media hosting system 102 makes accessible to users are media items provided by users to the system 102 for storage and sharing. In one embodiment, the media items made accessible by the system 102 include media items identified in searches or crawls of websites or databases of other entities.

The publishing system 104 is a system that provides pages to user devices 106. In one embodiment, through a user device's browser 108, a user requests a page from the publishing system 104. The request includes an identifier of the page (e.g., a uniform resource identifier (URI)). When the publishing system 104 receives the request, the publishing system 104 identifies the page based on the identifier and provides the page to the user device 106.

A page provided by the publishing system 104 is a document or file with instructions (e.g., markup language). In one embodiment, the instructions are executed by a user device's browser 108. When the instructions are executed, it results in content of the page being presented to a user. The page content presented to a user may be, for example, social networking content, forums, news content, blogs, etc. In one embodiment, the pages provided by the publishing system 104 to user devices 106 are webpages that include JavaScript, HTML, XML or some other type of markup language.

The publishing system 104 and the media hosting system 102 have different address domains. For example, the media hosting system 102 may have an address domain of media-hostingsystem.com, while the publishing system 104 may have an address domain of publishingsystem.com. In one embodiment, the publishing system 104 and the media hosting system 102 are separate and independent of each other. For example, the publishing system 104 and the media hosting system 102 may be operated by different entities.

A user device 106 is an electronic computing device used by a user to communicate with entities connected to the network 110. A user device 106 may be, for example, a mobile phone, tablet computer, notebook computer, desktop computer, or personal digital assistant (PDA). As describe above, each user device 106 includes a browser 108. A user device's browser 108 is an application that provides an interface through which a user can communicate with the media hosting system 102 and the publishing system 104.

Upon request from a user, the browser 108 requests a page from the publishing system 104. When the user device 106 receives a requested page from the publishing system 104, the browser 108 executes instructions included in the page and renders content of the page within a browser window. At least some of the pages received from the publishing system 104 include instructions that cause the browser 108 to communicate with the media hosting system 102. In one embodiment, the instructions to communicate with the hosting system 102 are executed when a user requests, through page content, to upload media content to the hosting system 102. In another embodiment, the instructions to communicate with the hosting system 102 are executed when the requested page is received by the user device 106.

Figure 2:
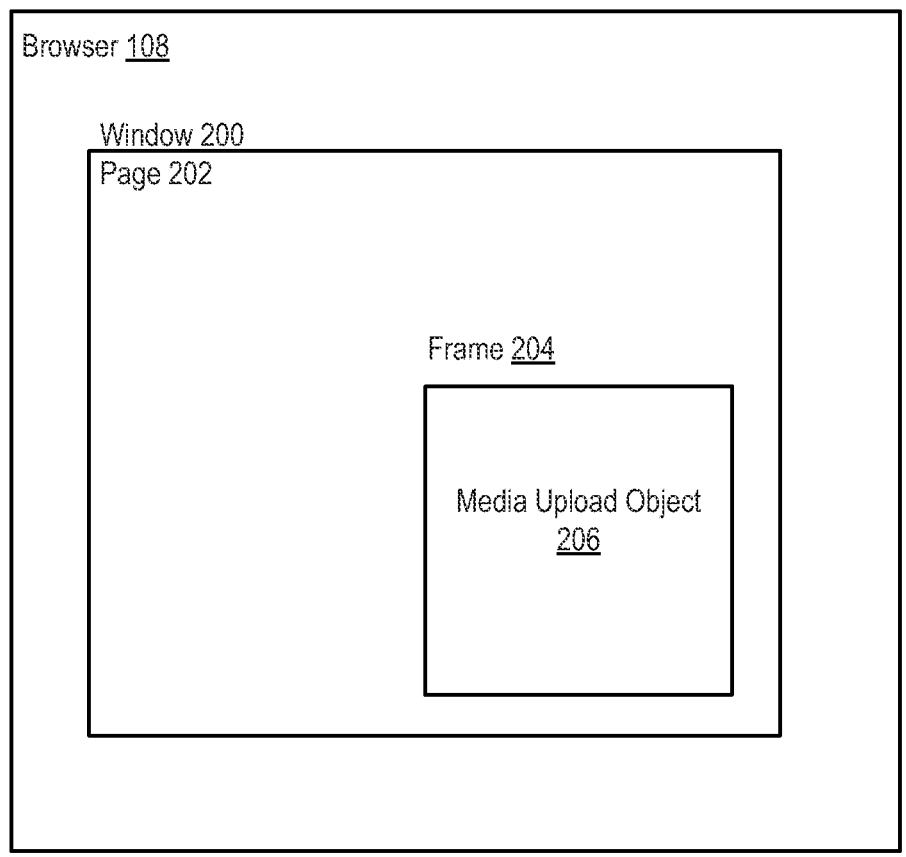
FIG. 2 illustrates an example of a frame within a page according to one embodiment.

The browser 108 communicates with media hosting system 102 to request instructions for loading a media upload object within the page's window. The browser 108 receives and executes the instructions from the media hosting system 102, which results in a frame being created within the page's window. The created frame includes content from the media hosting system 102. Specifically, the frame includes a media upload object through which a user can request to upload a media item to the media hosting system 102. FIG. 2 illustrates the page 202 presented by the browser 108 within the window 200 and the window 200 including the created frame 204. Within the frame 204 is the media upload object 206.

Since the media hosting system 102 and the publishing system 104 have different address domains, it signifies that frame 204 includes content from a different domain than the content included outside of the frame 204 and within the page window 200. The frame 204 includes content from the media hosting system's 102 domain and the page window 200 (outside the frame 204) includes content from the publishing system's domain. To allow the frame's media upload object 206 and the window's page 202 to communicate (i.e., to allow cross-domain communication/cross-document messaging), a communication channel is created between the frame 204 and the window 200 (i.e., a communication is created between the media upload object 206 and the page 202). In one embodiment, the communication channel is created when the frame 204 is created within the page 202. The communication channel is a means through which the media upload object 206 and the page 202 can communicate by exchanging messages between the frame 204 and the window 200. The communication channel enables the media upload object 206 and the page 202 to be aware of events that are occurring in each other's domain.

To create the communication channel, the media upload object 206 and the page 202 each create at least one event listener to accept messages from each other. The event listener created by the media upload object 206 allows the object 206 to receive messages from the page 202 (i.e., from the publishing system's domain). Similarly, the page's event listener allows the page 202 to receive messages from the media upload object 206 (i.e., from the media hosting system's domain). Once the communication channel is created, the media upload object 206 and the page 202 can exchange messages (i.e., messages can be exchanged between the window 200 and the frame 204). In one embodiment, the postMessage feature of HTML5 is used to exchange messages between window and 200 and the frame 204.

In one embodiment, when the communication channel is created, the page 202 sends a message to the media upload object 206 (i.e., a message is sent from the window 200 to the frame 204) indicating for which events that occur within the object's frame 204 it wishes to be notified. That is, the page 202 subscribes to receive notifications when certain events occur within the frame 204 (e.g., when user requests to upload a media item to the media hosting system 102).

In one embodiment, the page 202 sends a message to the mobile upload object 206 via the communication channel indicating metadata that should be included with any media item uploaded to the media hosting system 102. For example, the page 202 may indicate that an uploaded media item should be accessible by other users (e.g., public), keywords that should associated with an uploaded media item, and that a media item should be uploaded to an account of the user or an account of the publishing system 104 with the hosting system 102.

When the media upload object 206 is presented in the frame 204, a user can request through the media upload object 206 to create a media item using a media capture device and upload it to the media hosting system 102. The media capture device is a device that generates media, such as a webcam, a microphone, a video recorder, and a digital camera. The media capture device may be integrated within the user device 106 or external and connected to the user device 106.

When the user requests to start the creation of a media item (e.g., start recording), the media upload object 206 creates an upload connection with the media hosting system 102. The upload connection is a connection through which the media upload object 206 can stream media data to the media hosting system 102. In one embodiment, the upload connection is a Real Time Messaging Protocol (RTMP) connection. Additionally, the media upload object 206 initiates the media capture device so that it can start generating media data (e.g., video frames).

As the media capture device generates media data, the media upload object 206 streams the data to the media hosting system 102 via the upload connection. The media hosting system 102 buffers the data. When the user requests to stop the creation of the media item (e.g., stop recording), the media upload object 206 stops the media capture device. The media upload object 206 inquires of the user whether he wishes to finalize the upload. If the user requests to finalize the upload, the media upload object 206 requests from the media hosting system 102 that it create a media item. The media hosting system 102 creates the media item based on the media data received via the upload connection and stores the media item.

In another embodiment, instead of streaming the media data to the media hosting system 102 as it is being generated by the media capture device, the media data is stored at the user device 106. If the user requests to stop the creation of the media item and upload the stored media data to the media hosting system 102, the media upload object 206 then transmits the media data to the media hosting system 102 for storing the media item. In this embodiment, media data of the media item is not transmitted to the media hosting system 102 until the user directly requests to upload the media item after its respective media data has been created.

In one embodiment, the user provides metadata for the media item via the media upload object 206. The metadata provided for the media item may include, for example, a title, description, tags, keywords, category, whether the item should be accessible by other users (e.g., public). The media upload object 206 transmits the metadata to the media hosting system 102 for storage with the media item.

The media upload object 206 receives from the media hosting system 102 an identifier for the stored media item. The identifier can be used by a user to access the media item through the media hosting system 102. The identifier may be a uniform resource identifier (URI), such as a uniform resource locator (URL) or a uniform resource name (URN).

Throughout the process of creating and uploading the media item, the media upload object 206 may transmit messages to the page 202 via the communication channel to notify it of events occurring within the frame 204. For example, the media upload object 206 may notify the page 202 of one or more of the following events that occur: user requests to create the media item, the creation of the media item is started, creation of the media item is stopped, user requests to finalize the upload, the media item has been created and stored by the media hosting system 102, the media item is ready to be played (e.g., watched), the media item has been successfully transmitted to the media hosting system, and the identifier associated with the media item is available. In one embodiment, the media upload object 206 only notifies the page 202 of events for which the page 202 indicated that it wanted to receive messages. In one embodiment, after the media upload object 206 receives the identifier for the media item from the hosting system 102, the media upload object 206 provides the identifier to the page 202 via the communication channel.

The messages received by the page 202 from the media upload object 206 via the communication channel allow the page 202 to respond to what is occurring within the frame 204. As an example, assume the page 202 is part of a television show's website. The page 202 and the media upload object 206 are intended to allow users to create reaction videos to the show's new episode. When the user request via the media upload object 206 to start a webcam recording, the media upload object 206 notifies the page 202 of the recording start via the communication channel. Based on the notification, the page 202 can start playing the new episode in order for the webcam to capture the user's reactions.

Once the user requests to stop the recording, the media upload object 206 notifies page 202. Based on the notification, the page 202 can present a message to the user that says "Thank you for creating a reaction video." Additionally, the page 202 can present a URL through which the user can access the recording from the media hosting system 102. The URL is provided by the hosting system 102 to the media upload object 206, which forwards it to the page 202 via the communication channel.

In one embodiment, in addition to being able to create and upload a media item, a user can also request through the media upload object 206 to upload a media item already stored on the user device 106. When the user makes the request, the media upload object 206 presents an interface through which the user can browse through files stored on the user device 106. When the user selects a media item to upload, the media upload object 206 transmits the item to the media hosting system 102 for storage. The media upload object 206 receives an identifier for the stored media item and forwards it to the page 202 through the communication channel. Throughout the process of uploading the media item, the media upload object 206 may notify the page 202 of one or more of the following events that occur: user requests to upload the media item stored on the user device 106, the media item selected by user to upload, and when the media item has been stored by the media hosting system 102.

Figure 6A:
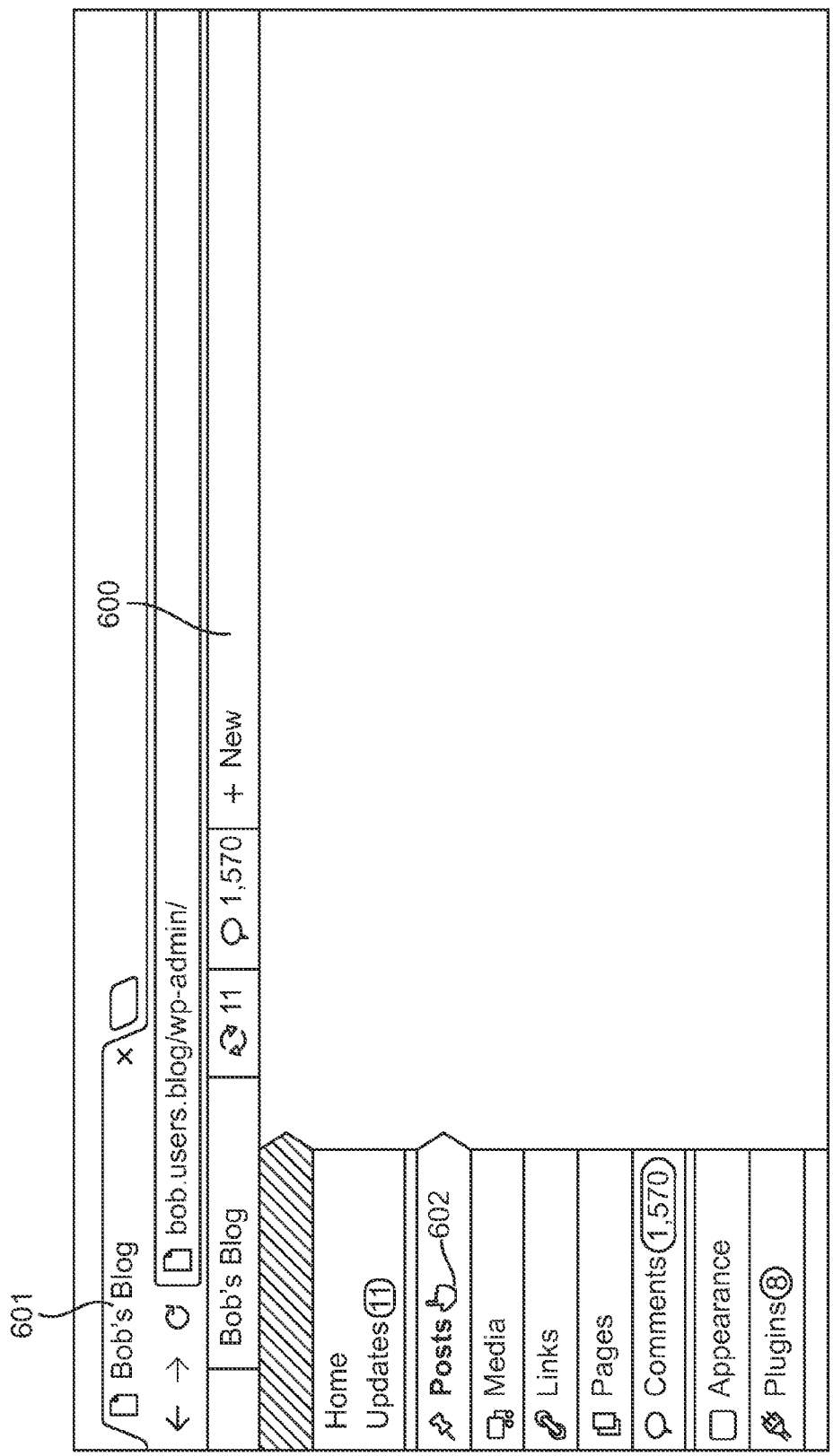
FIGS. 6A through 6I illustrate an example of creating and uploading a media item according to one embodiment.
Figure 6B:
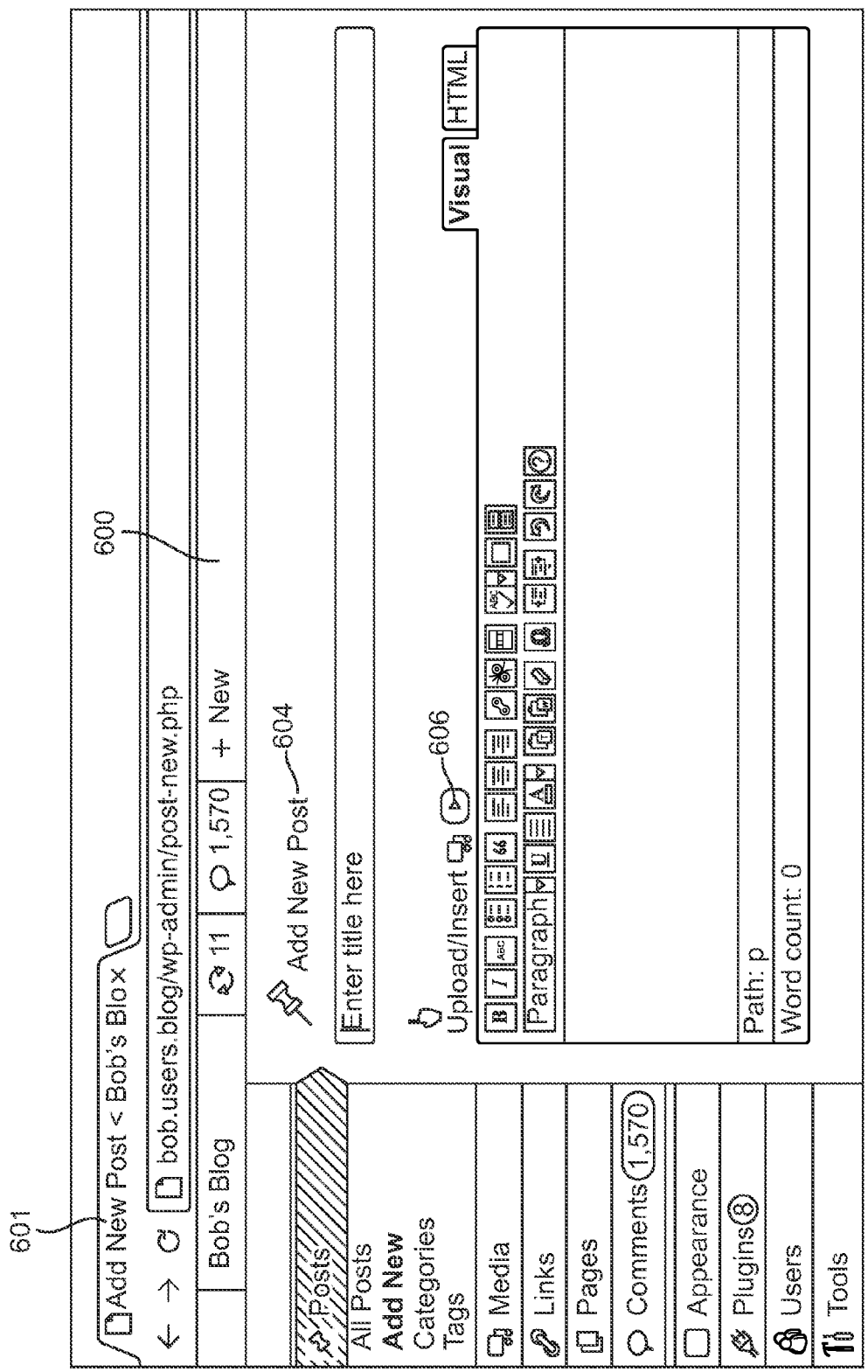

FIGS. 6A through 6I illustrate an example of creating and uploading a media item to the media hosting system 102. FIG. 6A illustrates a blog page 600 of a user in a browser window 601. The user can request to add a new post to his blog via interface element 602. FIG. 6B illustrates the interface 604 presented by the page 600 to allow the user to add a new post. The interface 604 includes an interface element 606 through which the user can request to record a video, upload it to the media hosting system 102, and insert a link to the video in the post. In response to user selection of interface element 606, the browser 108 executes instructions of the page 600 that cause it to communicate with the media hosting system 102 and receives instructions for loading a media upload object from the hosting system 102.

Figure 6C:
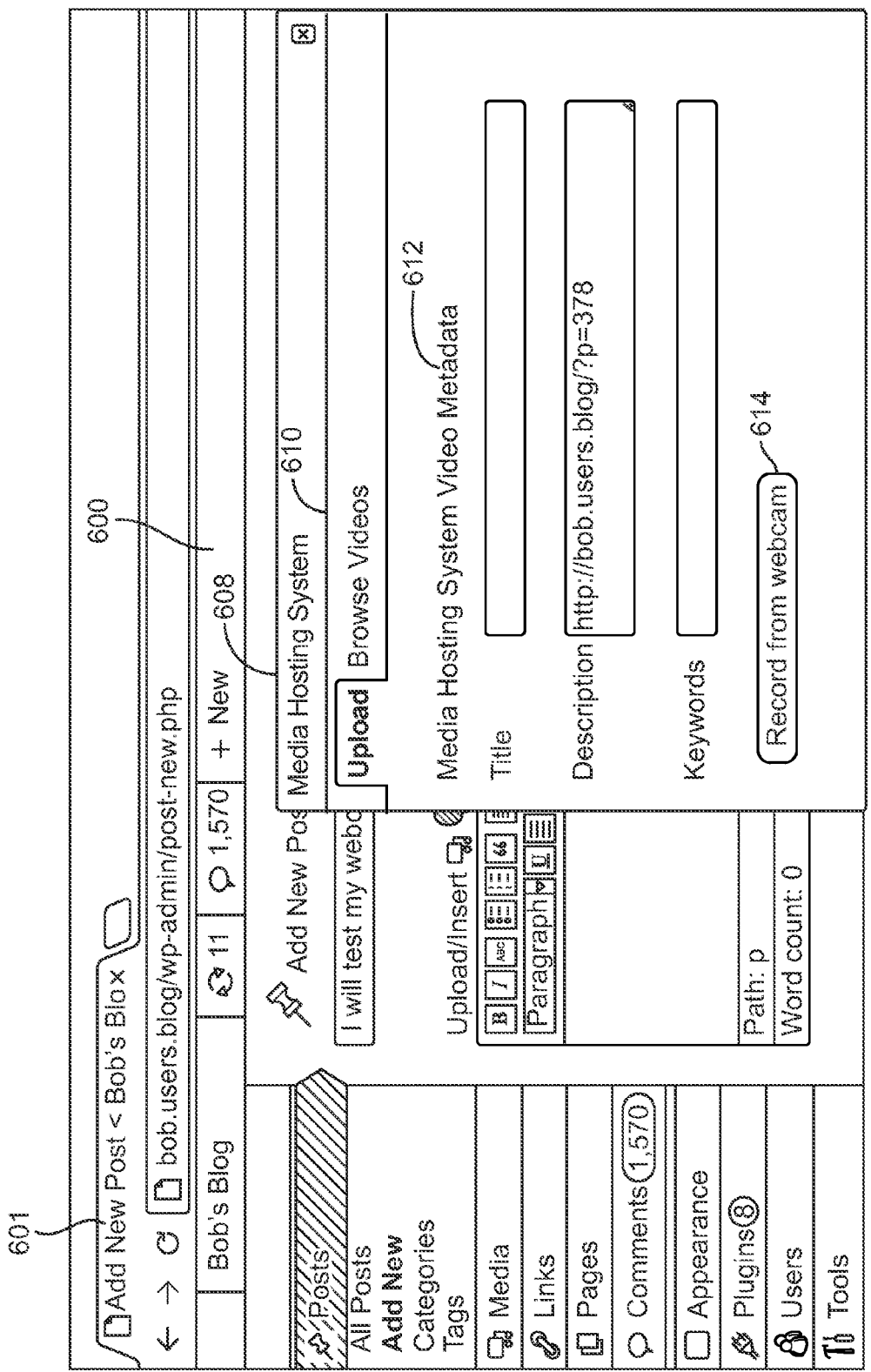

The received instructions are executed by the browser 108 and as shown in FIG. 6C a frame 608 is created within the page 600/window 604 that includes a media upload object 610. When the media upload object 610 is presented, it requests that the user provide metadata 612 for the video that is going to be created. The requested metadata for the video includes a title, a description, and keywords. The media upload object 610 forwards the received metadata to the media hosting system 102. The user selects interface element 614, when the user is ready to start recording the video.

Figure 6D:
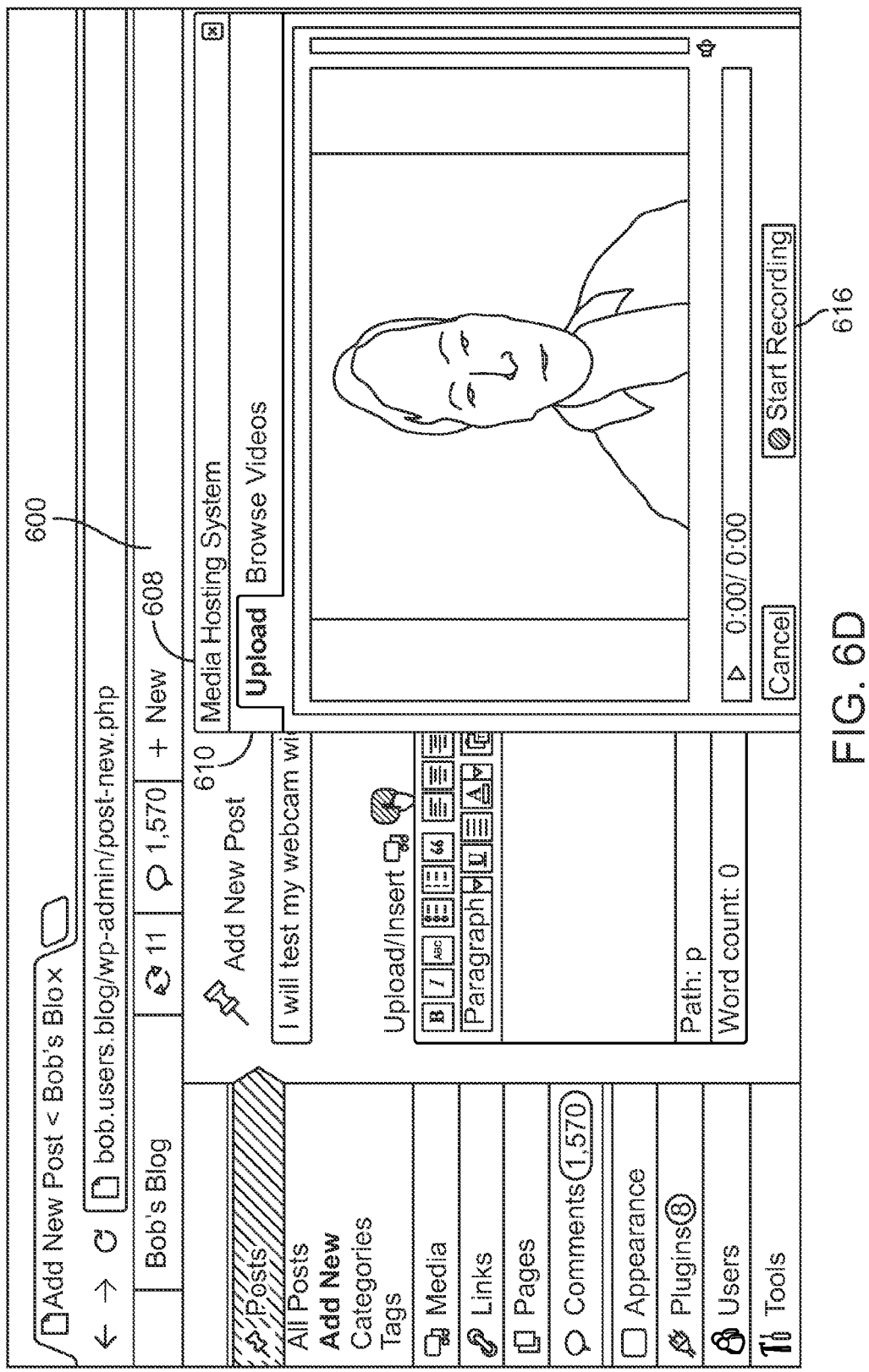
Figure 6E:
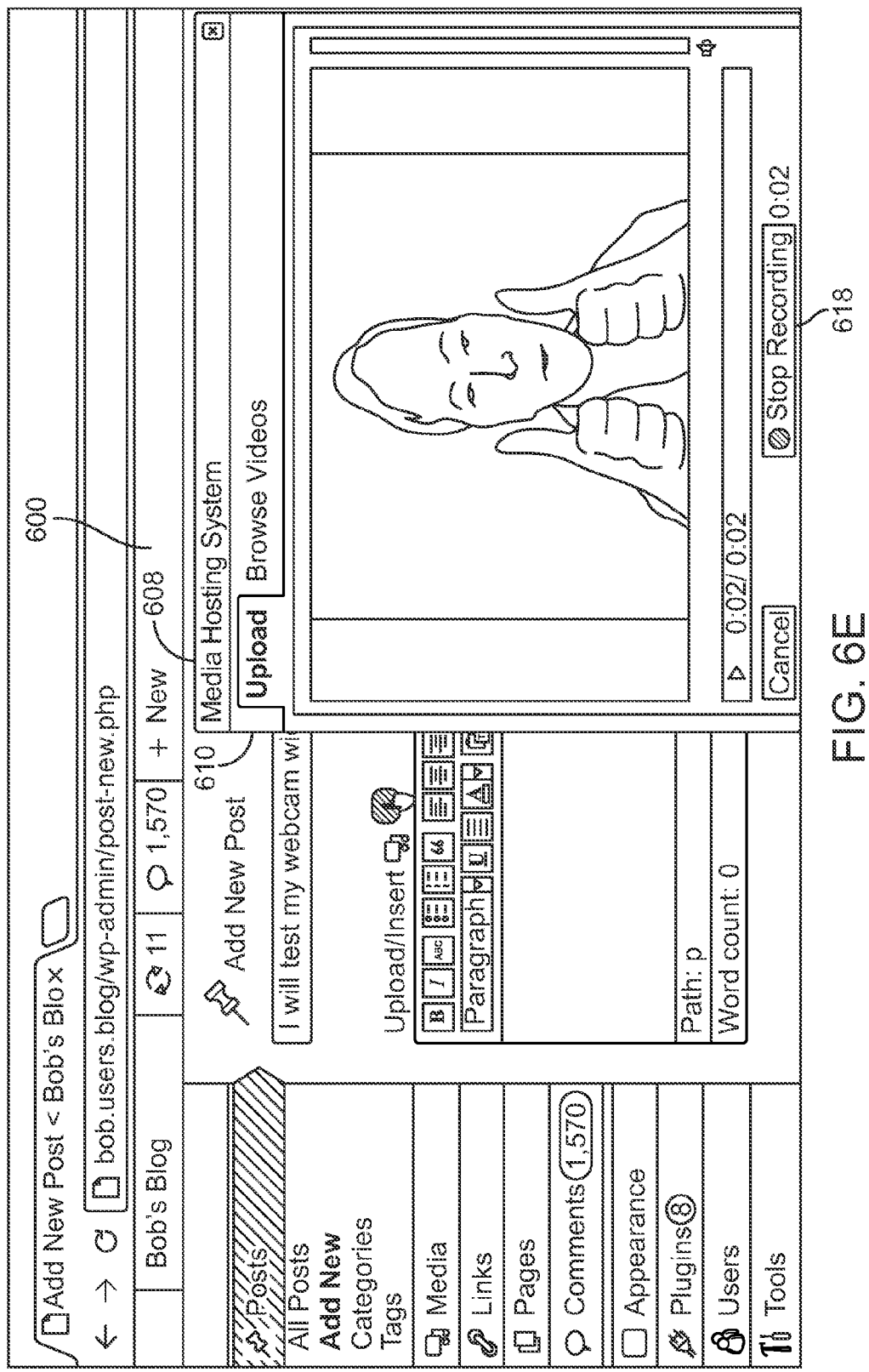
Figure 6F:
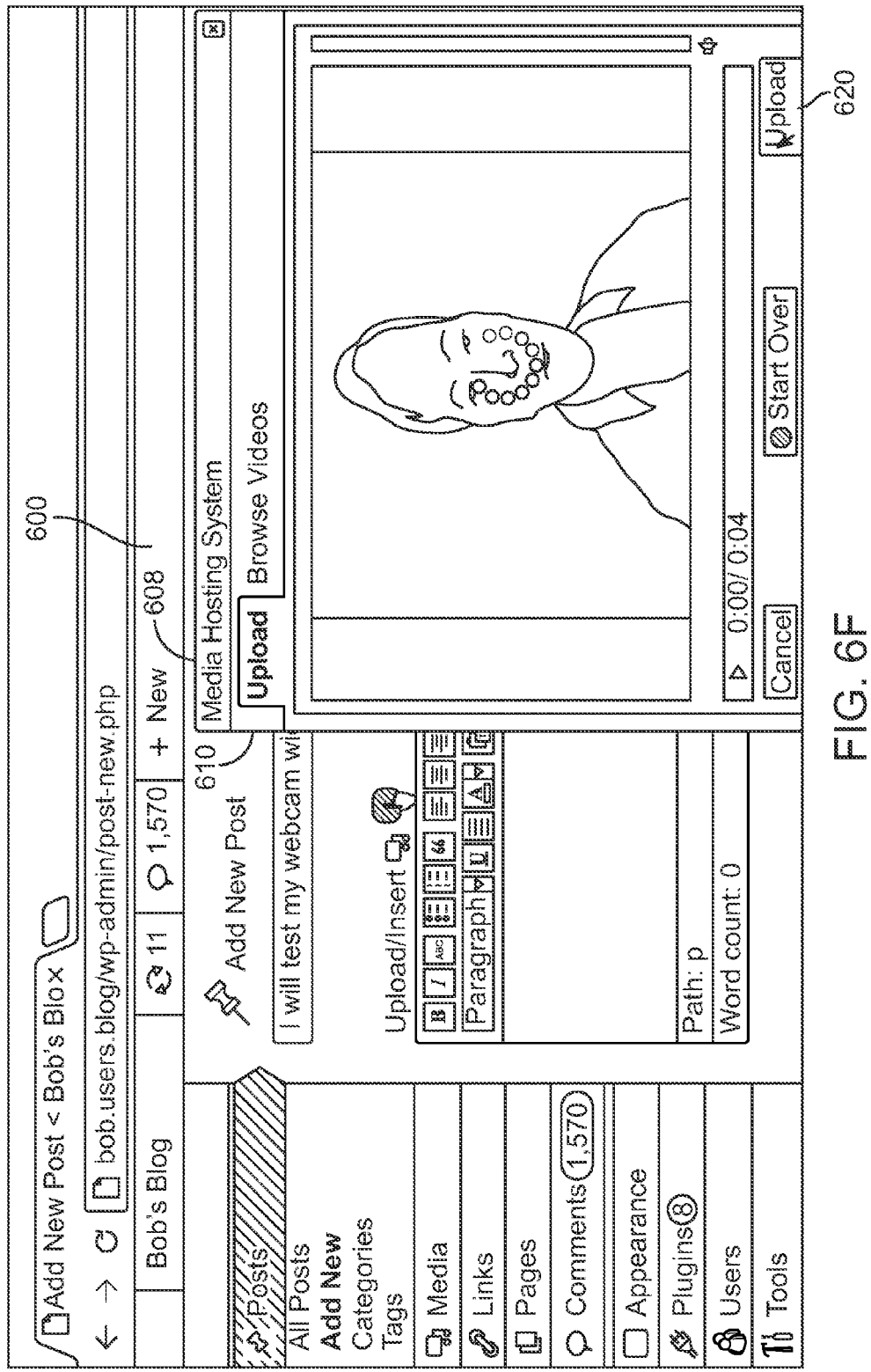

FIG. 6D illustrates the interface of the media upload object 610 when the user selects interface element 614. As can be seen, a video capture device such as a user's webcam is turned on. The video capture device starts recording a video when the user selects interface element 616. FIG. 6E illustrates the video being recorded. At any time the user can stop the recording by selecting interface element 618. As illustrated in FIG. 6F, when the recording of the video is stopped, media upload object 610 allows the user to request an upload of recorded video via interface element 620. In one embodiment, when the user selects interface element 620, the media upload object 610 transmits the recorded video to the media hosting system 102 for storage. In another embodiment, while the video capture device is recording, the media upload object 610 transmits the video frames being created to the hosting system 102. When the user selects interface element 620, the media upload 610 notifies hosting system 102 to create and store a video based on the provided video frames.

Figure 6G:
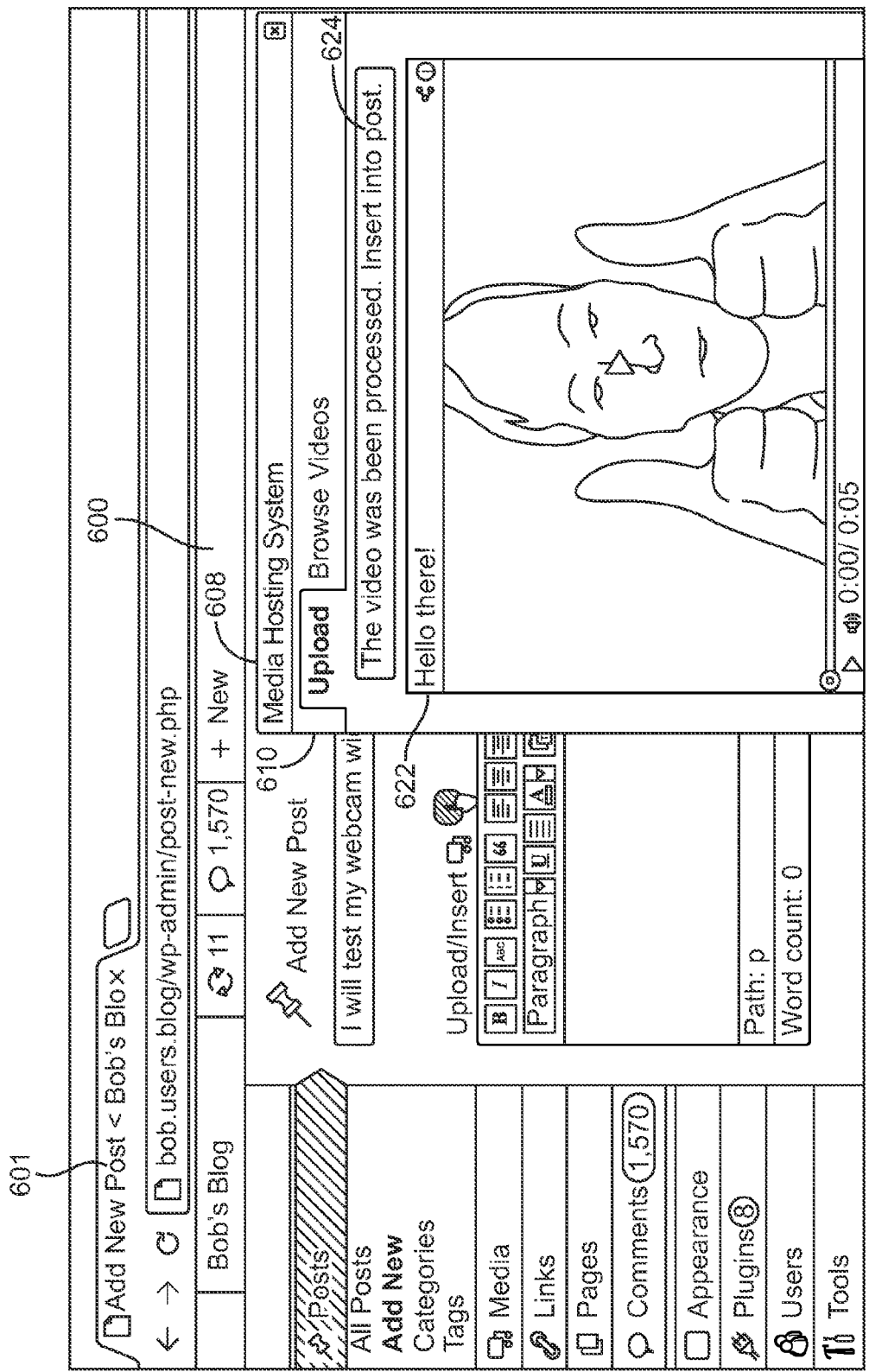
Figure 6H:
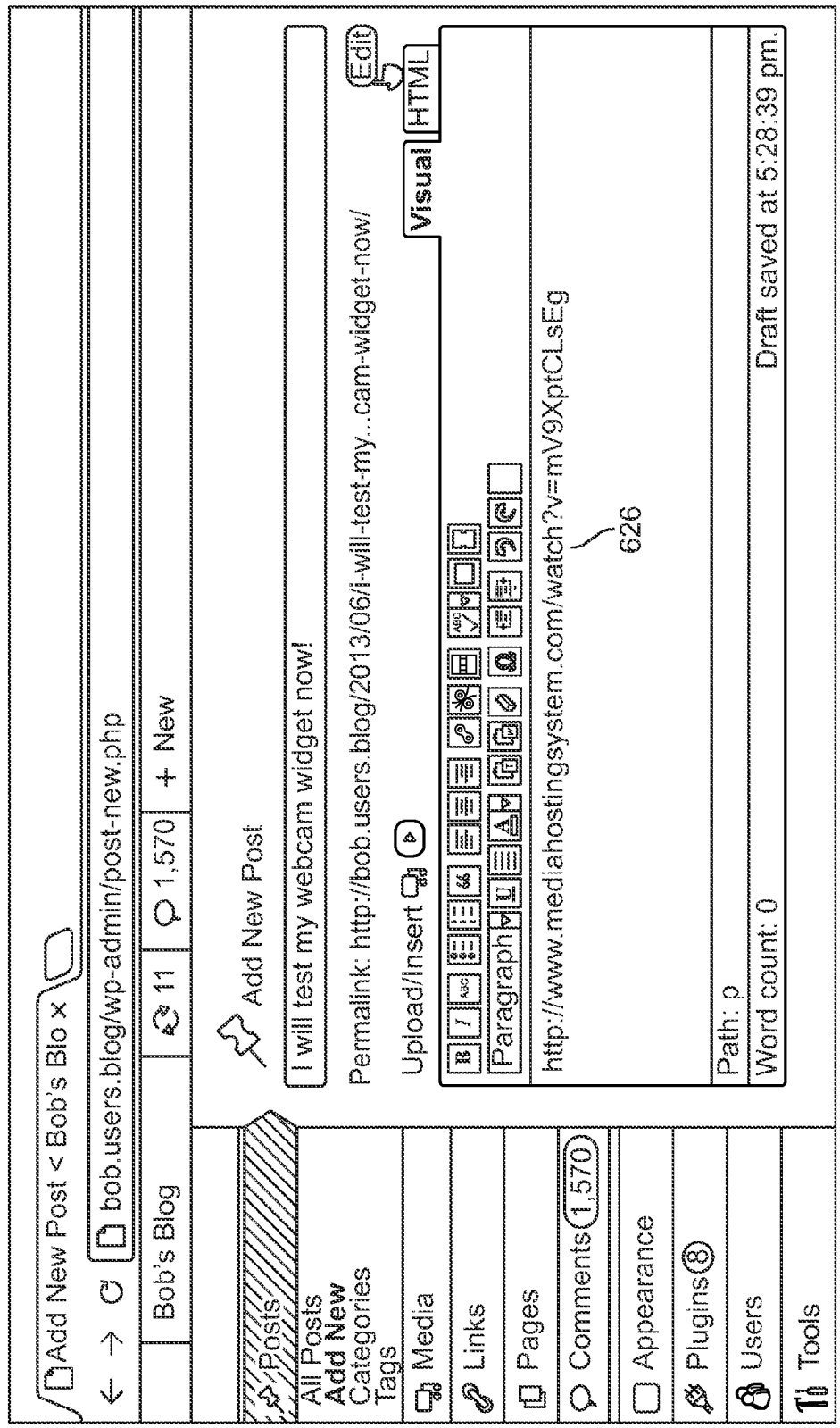
Figure 6I:
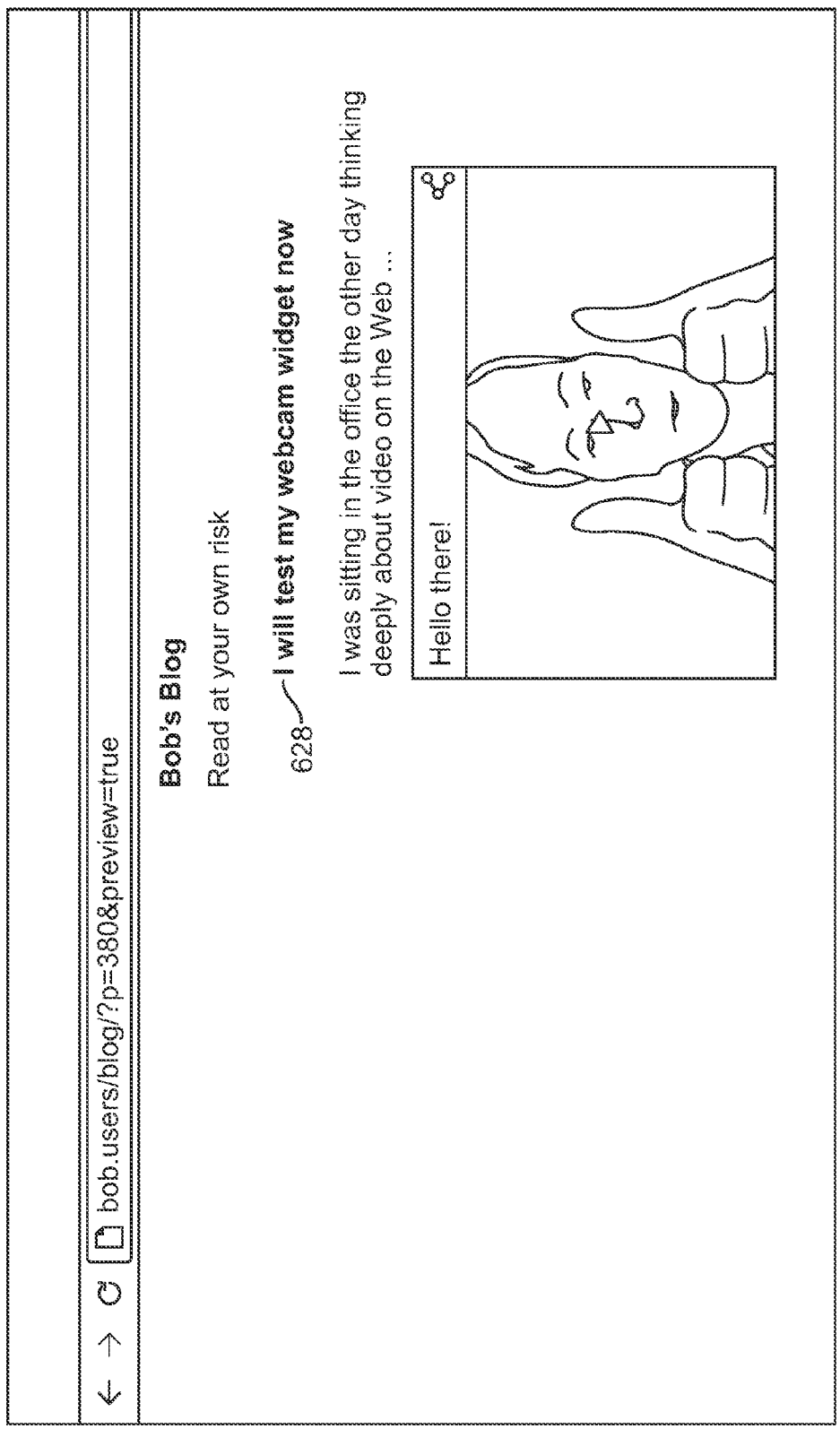

FIG. 6G illustrates one embodiment in which when the video has been stored by the media hosting system 102, the media upload object 610 presents a video player 622 through which the user can play the stored video. Additionally, interface element 624 allows the user to request that a URL of the video be inserted in the blog post. Through the URL, any user can access the video from the media hosting system 102. When the user selects interface element 624, the media upload object 610 transmits the URL to the page 600 via a communication channel created between the frame 608 and the page window 601 (e.g., the URL is transmitted in a HTML5 postMessage from the frame to the page window 601). Once the URL is transmitted, the media upload object 610 closes the frame 608, as illustrated in FIG. 6H. The URL received by the page 600 via the communication channel allows the URL 626 to be inserted into the blog post. FIG. 6I illustrates that based on the URL a video player for accessing the video can be included in the blog post 628. Thus, the communication channel between the media upload object 610 and the page 600 allowed the page 600 to receive the URL and include it within the post 628.

Figure 3:
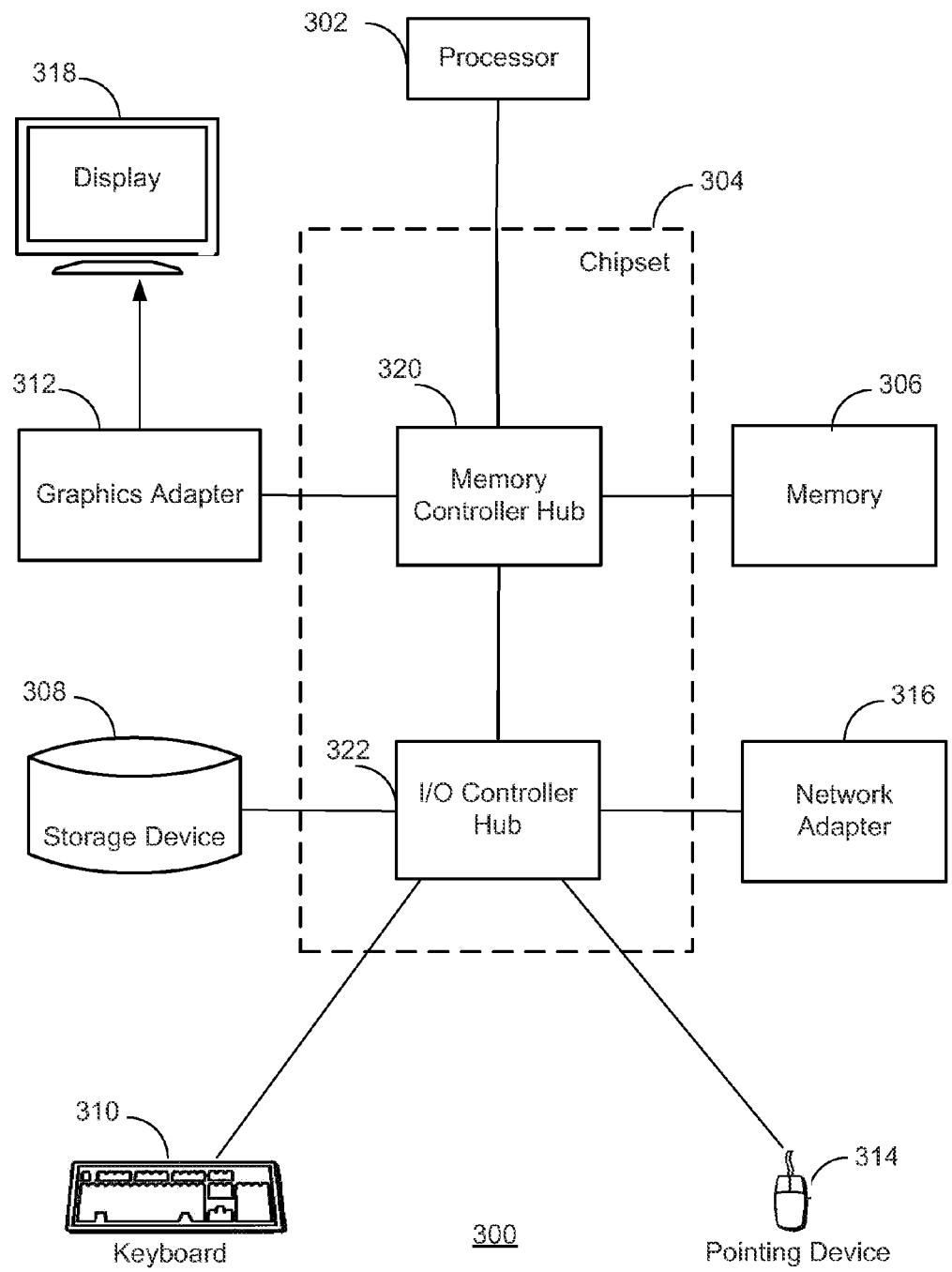
FIG. 3 is a block diagram illustrating a functional view of a typical computer system for use as one of the entities illustrated in the environment of FIG. 1 according to one embodiment.

FIG. 3 is a block diagram illustrating a functional view of a typical computer system 300 for use as one of the entities illustrated in the environment 100 of FIG. 1 according to an embodiment. Illustrated are at least one processor 302 coupled to a chipset 304. Also coupled to the chipset 304 are a memory 306, a storage device 308, a keyboard 310, a graphics adapter 312, a pointing device 314, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is a non-transitory computer-readable storage medium, such as a hard drive, compact disk read-only memory (CD-ROM), DVD, or a solid-state memory device. The memory 306 holds instructions and data used by the processor 302. The pointing device 314 may be a mouse, track ball, or other type of pointing device, and is used in combination with the keyboard 310 to input data into the computer system 300. The graphics adapter 312 displays images and other information on the display 318. The network adapter 316 couples the computer system 300 to the network 110. Some embodiments of the computer system 300 have different and/or other components than those shown in FIG. 3. For example, a user device 106 may additionally include a media capture device.

The computer 300 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 308, loaded into the memory 306, and executed by the processor 302.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 300 used by the entities of FIG. 1 can vary depending upon the embodiment and the processing power used by the entity. For example, a user device 106 that is a mobile phone typically has limited processing power, a small display 318, and might lack a pointing device 314. The media hosting system 102 and publishing system 104, in contrast, may comprise multiple blade servers working together to provide the functionality described herein.

Figure 4:
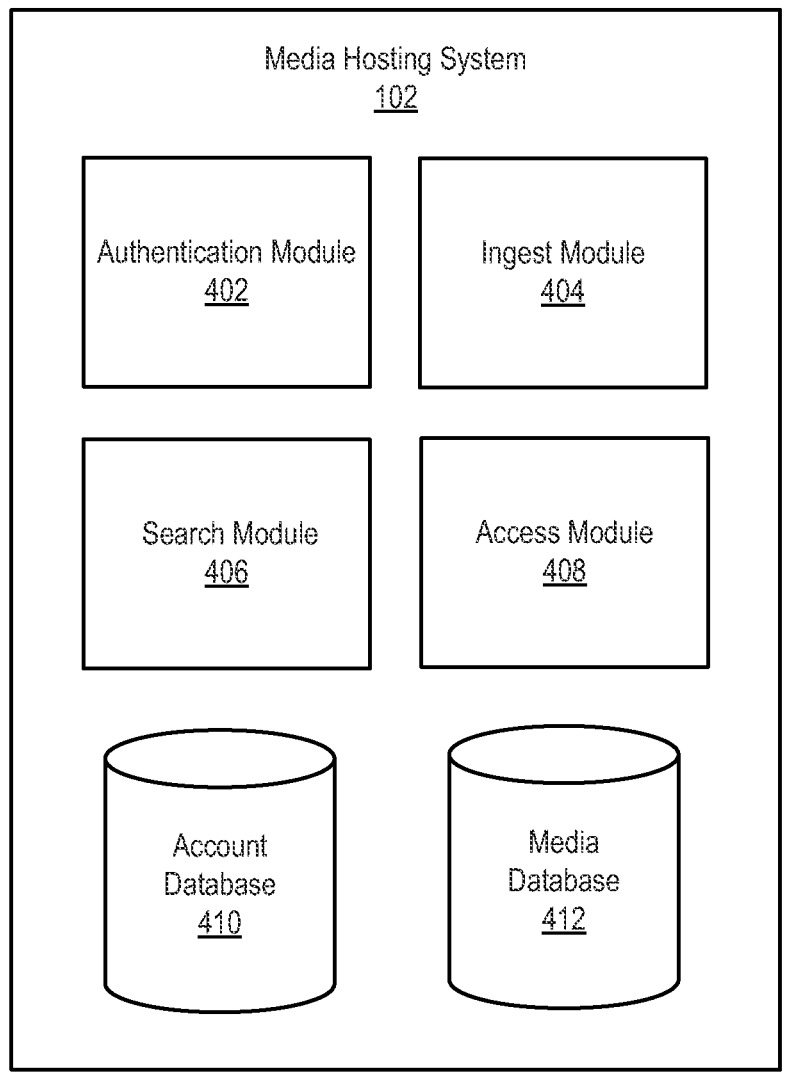
FIG. 4 is a block diagram illustrating modules within a media hosting system according to one embodiment.

FIG. 4 is a block diagram illustrating modules within the media hosting system 102 according to one embodiment. The media hosting system 102 includes an authentication module 402, an ingest module 404, a search module 406, an access module 408, an account database 410, and a media database 412. Those of skill in the art will recognize that other embodiments can have different and/or other modules than the ones described here, and that the functionalities can be distributed among the modules in a different manner.

The authentication module 402 authenticates users of the media hosting system 102. In one embodiment, the authentication module 402 maintains in an account database 410 authentication information for each user that has created an account with the media hosting system 102 (e.g., signed up) to use the services provided by the media hosting system 102. In one embodiment, the authentication information includes a username and a password.

In one embodiment, when a user device 106 communicates with the media hosting system 102 to perform certain actions, the media hosting system 102 authenticates the user of the device 106 to verify that the user has an account with the media hosting system 102. For example, the media hosting system 102 may authenticate a user when the user's device 106 communicates with the media hosting system 102 to upload a media item.

To authenticate a user, the authentication module 402 checks whether the user device's browser 108 includes a cookie with authentication information of the user. If the browser 108 includes a cookie, the authentication module 402 verifies that the authentication information included in the cookie matches the information stored in the account database 410 for the user. If the browser 108 does not include a cookie, the authentication module 402 transmits to the user device 106 instructions to present an interface through which the user can provide his authentication information. When the user provides authentication information via the interface, the authentication module 402 verifies the authentication information. In other embodiment, other methods may be used to authenticate the user, such as the user device 106 providing an OAuth token.

In one embodiment, if the user has not previously created an account with the media hosting system 102 and requests to create an account, the user goes through a sign up process. In one embodiment, in the sign up process, the user chooses his respective authentication information (e.g., username and password). The authentication information is stored in the account database 410 by the authentication module 402.

The ingest module 404 allows users to upload media items for storage and accessibility by other users. When media hosting system 102 receives from a user device 106 a request for instructions to load a media upload object within a page, the ingest module 404 transmits instructions to create a frame within the page that includes the media upload object. Through the media upload object, a user can request to create and upload a media item, as described above. Additionally, a user can browse through media items stored on the user device 106 and select a media item to upload.

When the media hosting system 102 starts to receive media data of a media item being uploaded by a user device 106, the ingest module 404 buffers the media data. Once the upload is complete, the ingest module 404 creates the media item based on the buffered media data. In one embodiment, the ingest module 404 waits for an instruction from the user device 106 to create the media item before creating the media item. The ingest module 404 stores the media item in the media database 412 which includes media items accessible by users from the media hosting system 102. The ingest module 404 creates a unique identifier for the media item and stores the identifier in the media database 412 with the media item. In one embodiment, the ingest module 404 transmits the media item's identifier to the user device 106. The ingest module 404 also stores in the media database 412 metadata received from the user device 106 for the media item.

In one embodiment, the ingest module 404 associates the uploaded media item with an account of the user of the device 106 or with an account of the page's publishing system 104 in the account database 410. The ingest module 404 determines which account to associate the item with based on metadata received from the user device 106. In one embodiment, the entity with whom the media item is associated has administrative rights over the media item. Administrative rights include, for example, being able to edit the metadata of the item or being able to have the item removed from the media database 412.

The search module 406 processes search queries received from user devices 106. If a user is interested in accessing a media item, the user may submit a search query to help identify the media item. The search query may include keywords or phrases related to the media item. When a search query is received from a user device 106, the search module 406 searches the metadata of media items stored in the media database 412 to identify media items that match the query. The search module 406 generates search results that include information on media items that best match the search query. The search module 406 transmits the search results to the user device 106 for presentation to the user of the device 106. From the search results, the user can request to access a specific media item stored in the media database 412.

The access module 408 processes requests to access media items. A request to access a media item includes an identifier of the media item. When a request to access a media item is received from a user device 106, the access module 408 identifies the identifier of the media item included in the request. The access module 408 identifies in the media database 412 a media item with the associated identifier. The access module 408 transmits the media item to the user device 106 for presentation to the user. In one embodiment, the access module 408 streams the media item to the user device 106. The media item is presented to a user at the user device 106 via a media player.

Figure 5A:
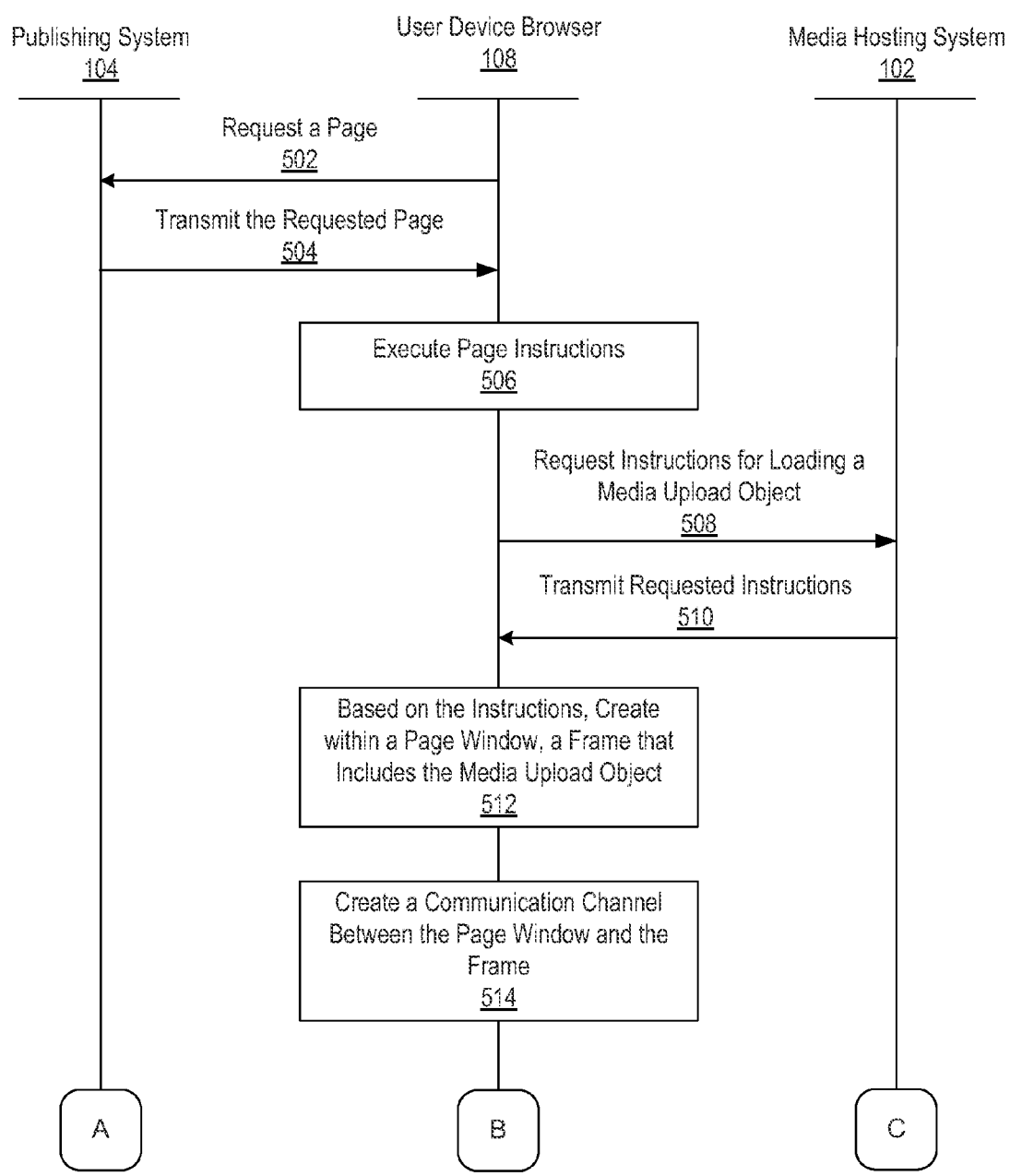
FIGS. 5A and 5B illustrate an interaction diagram of a process for creating and uploading a media item according to one embodiment.
Figure 5B:
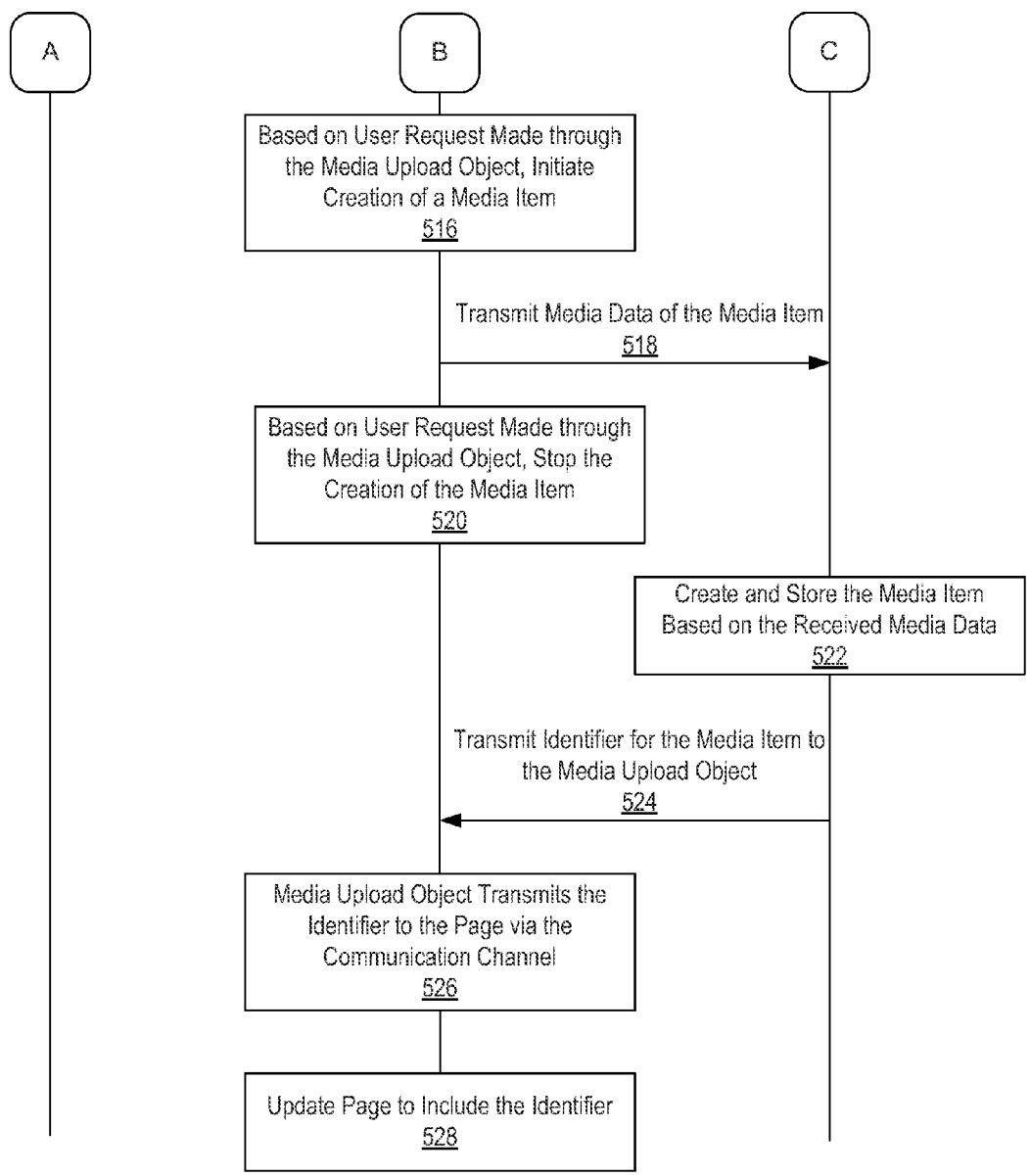

FIGS. 5A and 5B illustrate an interaction diagram of a process for creating and uploading a media item according to one embodiment. The interaction diagram illustrates the steps performed by the media hosting system 102, the publishing system 104, and a browser 108 installed on a user device 106 during the process. Those of skill in the art will recognize that other embodiments can perform the steps of FIGS. 5A and 5B in different orders. Moreover, other embodiments can include different and/or additional steps than the ones described herein.

Starting with FIG. 5A, the browser 108 requests 502 a page from the publishing system 104. The publishing system 104 transmits 504 the requested page to the browser 108. The browser 108 executes 506 instructions included in the page. As part of executing the instructions, the browser 108 requests 508 instructions from the media hosting system 102 for loading a media upload object. The media hosting system 102 transmits 510 the requested instructions to the browser 108. The browser executes the requested instructions and based on the instructions creates 512 a frame within a window that includes the content of the page. The frame includes the media upload object. The browser 108 creates 514 a communication channel between the page window and the frame.

Continuing in FIG. 5B, based on a request made by the user through the media upload object to start the creation of a media item, the browser 108 initiates 516 the creation of the media item. The creation of the media item may be initiated, for example, by instructing a media capture device to start recording. The browser 108 transmits 518 media data of the media item being created to the media hosting system 102. Based on a request made by the user through the media upload object, the browser 108 stops 520 the creation of the media item. The media hosting system 102 creates 522 the media item based on the media data received and stores the media item.

The media hosting system 102 transmits 524 an identifier for the stored media item to the media upload object. Through the communication channel, the media upload object transmits 526 the identifier to the page. The browser 108 updates 528 the page to include the identifier. It should be understood that in other embodiments, the media upload object may transmit additional messages to the page via the communication channel to notify the page of events that occur within the frame.

Some portions of above description present the features of embodiments in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by real time network operating systems.

The disclosure of the embodiments is intended to be illustrative, but not limiting, of the full scope of the embodiments, which is set forth in the following claims.

The invention claimed is:
1. A computer-implemented method comprising:
creating a frame within a window that includes content of a page received by a user device from a publishing system, the frame created based on instructions received from a hosting system, the frame including an upload object from the hosting system, the hosting system having a different address domain than the publishing system;

establishing a communication channel between the window and the frame, the communication channel comprised of a first event listener for the page to receive messages from the upload object and a second event listener for the upload object to receive messages from the page;

receiving, by the upload object from the page via the communication channel, notification instructions indicating that the upload object notifies the page of a plurality of events when they occur within the frame, at least one of the plurality of events being the upload object receiving from the hosting system an identifier associated with a video created via the upload object;

initiating a video capture device based on a user request made through the upload object, the video capture device generating video data responsive to the initiation;

transmitting the generated video data to the hosting system;

receiving, by the upload object from the hosting system an identifier associated with a video created based on the video data and stored by the hosting system; and transmitting, based on the notification instructions, the identifier directly from the upload object to the page via the communication channel, the content of the page updated based on the identifier.

2. The method of claim 1, wherein the instructions received from the hosting system are received responsive to instruction included in the page being executed by a browser and directing the browser to request instructions from the hosting system for loading the upload object.

3. The method of claim 1, further comprising: responsive to an additional event from plurality of events occurring within the frame, transmitting, by the upload object to the page via the communication channel, a message indicating that the additional event occurred.

4. The method of claim 3, wherein the additional event is one of the following: user requests to create the video, creation of the video is started, the user requests to upload the video, the video is selected by the user to upload, and the video has been stored by the hosting system.

5. The method of claim 3, wherein the page causes a browser to perform an action responsive to receiving the message.

6. The method of claim 1, wherein the received identifier is included in the content of the page.

7. The method of claim 1, wherein the identifier is a uniform resource identifier for accessing the video.

8. The method of claim 1, further comprising: receiving, by the upload object from the page via the communication channel, metadata; and receiving, by the upload object from the page via the communication channel, additional instructions indicating that the metadata be included with video data transmitted to the hosting system.

9. The method of claim 8, wherein the metadata indicates that the video data be associated with an account of the publishing system with hosting system.

10. The method of claim 8, wherein the metadata indicates that the video data be accessible by a set of users.

11. A computer implemented method comprising:

creating a frame within a window that includes content of a page received by a user device from a publishing system, the frame created based on instructions received from a media hosting system, the frame including a media upload object from the media hosting system, the media hosting system having a different domain than the publishing system;

establishing a communication channel between the window and the frame, the communication channel comprised of a first event listener for the page to receive messages from the media upload object and a second event listener for the media upload object to receive messages from the page;

receiving, by the media upload object from the page via the communication channel, notification instructions indicating that the media upload object notifies the page of a plurality of events when they occur within the frame, at least one of the plurality of events being the media upload object receiving from the media hosting system an identifier associated with a media item;

transmitting a media item to the media hosting system for storage, the transmission of the media item initiated through the media upload object;

receiving, by the media upload object from the media hosting system an identifier associated with the transmitted media item stored by the media hosting system; and transmitting, based on the notification instructions, the identifier directly from the media upload object to the page via the communication channel, the content of the page updated based on the identifier.

12. The method of claim 11, wherein the media item transmitted to the media hosting system is stored on the user device and selected for transmission by the user via the media upload object.

13. The method of claim 11, wherein the media item transmitted to the media hosting system is created by a media capture device based on a request provided by a user to the media upload object.

14. The method of claim 11, wherein the identifier associated with the transmitted media item is a uniform resource identifier for accessing the media item.

15. The method of claim 11, wherein the identifier associated with the transmitted media item is presented within the page.

16. The method of claim 11, wherein the instructions received from the media hosting system are received responsive to instructions included in the page being executed by a browser and directing the browser to request instructions from the media hosting system for loading the media upload object.

17. A computer-implemented method comprising:

transmitting, by a media hosting system, instructions to a user device, the instructions causing a frame to be created within a window that includes content of a page presented at the user device, the frame including a media upload object, the page received by the user device from a publishing system having a different domain than the media hosting system;

receiving, by the media hosting system, a media item transmitted by the user device, transmission of the media item initiated at the user device through the media upload object;

storing, by the media hosting system, the media item; and transmitting, by the media hosting system to the media upload object, an identifier associated with the stored media item, wherein the identifier is transmitted by the media upload object via a communication channel directly to the page in the window based on notification instructions provided by the page to the media upload object indicating that the media upload object notifies the page of a plurality of events when they occur within the frame, at least one of the plurality of events being the media upload object receiving from the media hosting system an identifier associated with a media item, and wherein the communication channel is comprised of a first event listener for the page to receive messages from the media upload object and a second event listener for the media upload object to receive messages from the page.

18. The method of claim 17, wherein the identifier associated with the stored media item is a uniform resource identifier for accessing the video.

* * * * *